(12) United States Patent
Kitada et al.

(10) Patent No.: US 11,866,596 B2
(45) Date of Patent: Jan. 9, 2024

(54) AQUEOUS INK JET COMPOSITION

(71) Applicant: Seiko Epson Corporation, Tokyo (JP)

(72) Inventors: Kenji Kitada, Shiojiri (JP); Hiroko Hayashi, Shiojiri (JP); Yasunari Ikeda, Shiojiri (JP); Hisashi Okamura, Shiojiri (JP); Kenta Kikuchi, Suwa (JP); Hirofumi Hokari, Chino (JP); Shinichi Naito, Chino (JP); Kazumasa Otsuki, Matsumoto (JP); Michio Nakamori, Matsumoto (JP); Shinichi Yamamoto, Matsumoto (JP); Seiji Kagami, Chino (JP); Shigeki Kawada, Shiojiri (JP)

(73) Assignee: SEIKO EPSON CORPORATION

( * ) Notice: Subject to any disclaimer, the term of this patent is extended or adjusted under 35 U.S.C. 154(b) by 735 days.

(21) Appl. No.: 16/775,317

(22) Filed: Jan. 29, 2020

(65) Prior Publication Data

US 2020/0239718 A1 Jul. 30, 2020

(30) Foreign Application Priority Data

Jan. 30, 2019 (JP) ................................. 2019-014888

(51) Int. Cl.
*C09D 11/328* (2014.01)
*C08K 5/3415* (2006.01)
*C08K 5/42* (2006.01)
*C08K 5/1515* (2006.01)
*C08L 71/02* (2006.01)
*C08K 5/13* (2006.01)

(52) U.S. Cl.
CPC .............. *C09D 11/328* (2013.01); *C08K 5/13* (2013.01); *C08K 5/1515* (2013.01); *C08K 5/3415* (2013.01); *C08K 5/42* (2013.01); *C08L 71/02* (2013.01)

(58) Field of Classification Search
CPC ...... C09D 11/328; C08K 5/13; C08K 5/1515; C08K 5/3415; C08K 5/42; C08L 71/02
See application file for complete search history.

(56) References Cited

U.S. PATENT DOCUMENTS 4,713,081 A * 12/1987 Becker .................... D06P 5/004
8/558
5,131,916 A * 7/1992 Eichenauer ............ C09D 11/50
524/95
7,507,283 B2 3/2009 Akatani et al.
2006/0014856 A1 1/2006 McGorrin et al.
2008/0193648 A1 8/2008 Becker et al.
2016/0075879 A1 3/2016 Ikeda et al.
2017/0158899 A1* 6/2017 Willems .................... B41J 2/01
2017/0218203 A1* 8/2017 Harada .................. C09D 11/50

FOREIGN PATENT DOCUMENTS

| CN | 101018832 A | 8/2007 |
|---|---|---|
| JP | 2008-535988 A | 9/2008 |
| JP | 2016-190932 A | 11/2016 |
| WO | WO-2005-121263 A1 | 12/2005 |

* cited by examiner

*Primary Examiner* — John E Uselding
(74) *Attorney, Agent, or Firm* — Harness, Dickey & Pierce, P.L.C.

(57) ABSTRACT

An aqueous ink jet composition of the present disclosure includes: at least one dye selected from the group consisting of C.I. Solvent Yellow 160:1, C.I. Disperse Yellow 82, and C.I. Disperse Yellow 184; a material A which is at least one compound selected from the group consisting of a compound represented by the following formula (1), a compound represented by the following formula (2), an ethylene oxide adduct of tristyrylphenol, a derivative of an ethylene oxide adduct of tristyrylphenol, a polyalkylene glycol, and a derivative of a polyalkylene glycol; and an anionic dispersant.

[Chem. 1]

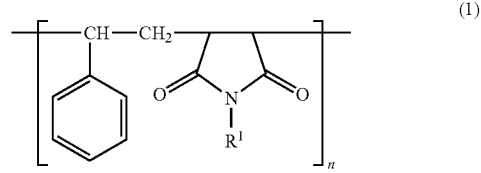

[Chem. 2]

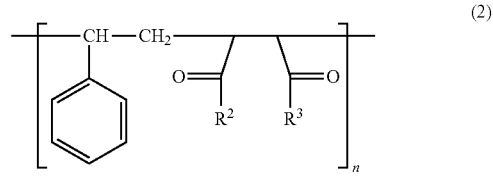

9 Claims, No Drawings

AQUEOUS INK JET COMPOSITION

The present application is based on, and claims priority from, JP Application Serial Number 2019-014888, filed Jan. 30, 2019, the disclosure of which is hereby incorporated by reference herein in its entirety.

BACKGROUND

1. Technical Field

The present disclosure relates to an aqueous ink jet composition.

2. Related Art

In recent years, the application of ink jet printing has been increased, and besides printing by office and household printers, the ink jet printing is also applied to commercial printing, textile printing, and the like.

In addition, an ink-jet ink containing a sublimation dye, such as a disperse dye or a solvent dye, has also been used.

The ink-jet ink as described above has been used for a direct printing method in which after an ink is applied to a recording medium to be dyed, a dye is fixed by a heat treatment, such as steaming, and for a thermal transfer printing method in which after a dye ink is applied to an intermediate transfer medium, a dye is sublimation-transferred by heating from an intermediate transfer medium side to a recording medium to be dyed.

The ink-jet ink containing a disperse dye or a solvent dye has problems in that, in general, due to inferior long-term dispersion stability of a dye, storage stability of the ink is low, and ejection stability thereof by an ink jet method is also low.

In order to solve the problems described above, an ink composition described in International Publication No. WO2005/121263 has been proposed.

However, in the ink composition as described above, when a specific disperse dye or solvent dye is contained, a sufficiently excellent storage stability of the ink composition cannot be obtained, and problems of apparent generation of foreign materials during long-term storage and clogging of a head filter and/or a nozzle in ink ejection by an ink jet method may arise. In particular, the present inventor found that when at least one of C.I. Solvent Yellow 160:1, C.I. Disperse Yellow 82, C.I. disperse Yellow 184, each of which is a dye having an excellent yellow-base coloring property, is used as a dye, the problems as described above become serious.

SUMMARY

The present disclosure is made to solve the problems described above and can be realized as the following application examples.

An aqueous ink jet composition according to an application example of the present disclosure comprises: at least one dye selected from the group consisting of C.I. Solvent Yellow 160:1, C.I. Disperse Yellow 82, and C.I. Disperse Yellow 184; a material A which is at least one compound selected from the group consisting of a compound represented by the following formula (1), a compound represented by the following formula (2), an ethylene oxide adduct of tristyrylphenol, a derivative of an ethylene oxide adduct of tristyrylphenol, a polyalkylene glycol, and a derivative of a polyalkylene glycol; and an anionic dispersant.

[Chem. 1]

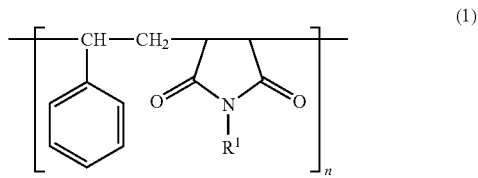

(1)

In the formula (1), $R^1$ represents a hydrocarbon group having six carbon atoms or less or $-(CH_2)_m-NR^8R^9$ (m represents an integer of six or less, and $R^8$ and $R^9$ each independently represent a hydrogen atom or a hydrocarbon group having six carbon atoms or less), and n represents an integer of one or more.

[Chem. 2]

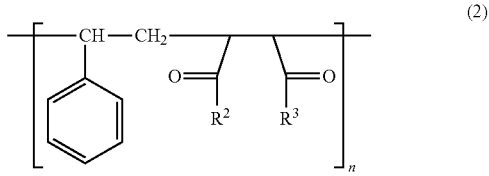

(2)

In the formula (2), one of $R^2$ and $R^3$ represents —OH, the other represents $-NR^4R^5$ ($R^4$ and $R^5$ each independently represent a hydrogen atom or a hydrocarbon group having six carbon atoms or less), and n represents an integer of one or more.

In addition, in an aqueous ink jet composition according to another application example of the present disclosure, the anionic dispersant may be at least one of a compound represented by the following formula (3), a sodium salt of a naphthalenesulfonic acid formalin condensate, and a lignin-sulfonic acid.

[Chem. 3]

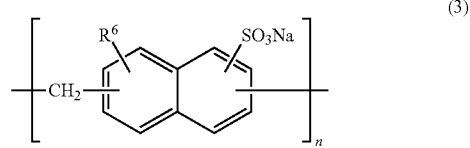

(3)

In the formula (3), $R^6$ represents a hydrocarbon group having four carbon atoms or less, and n represents an integer of one or more.

In addition, in an aqueous ink jet composition according to another application example of the present disclosure, the dye described above may contain at least C.I. Solvent Yellow 160:1, and when the content of C.I. Solvent Yellow 160:1 and the content of the material A in the aqueous ink jet composition are represented by XD and XA [percent by mass], respectively, $0.05 \leq XA/XD \leq 1.0$ may hold.

In addition, in an aqueous ink jet composition according to another application example of the present disclosure, the dye described above may contain at least C.I. Solvent Yellow 160:1, and when the content of C.I. Solvent Yellow 160:1 and the content of the anionic dispersant in the aqueous ink jet composition are represented by XD and XB [percent by mass], respectively, 0.4≤XB/XD≤2.0 may hold.

In addition, in an aqueous ink jet composition according to another application example of the present disclosure, when the content of the material A and the content of the anionic dispersant are represented by XA and XB [percent by mass], respectively, 0.02≤XA/XB≤1.5 may hold.

In addition, in an aqueous ink jet composition according to another application example of the present disclosure, the anionic dispersant may have a weight average molecular weight of 1,000 to 20,000.

In addition, in an aqueous ink jet composition according to another application example of the present disclosure, the material A may contain at least the polyalkylene glycol described above, and the polyalkylene glycol may have a weight average molecular weight of 1,000 to 20,000.

In addition, an aqueous ink jet composition according to another application example of the present disclosure may further comprise a cumarin compound having a chemical structure of at least one of a sulfo group and a salt thereof.

In addition, in an aqueous ink jet composition according to another application example of the present disclosure, the cumarin compound having a chemical structure of at least one of a sulfo group and a salt thereof may be at least one selected from the group consisting of C.I. Acid Yellow 184 and C.I. Acid Yellow 250.

In addition, an aqueous ink jet composition according to another application example of the present disclosure may be used in an air open-type recording apparatus.

DESCRIPTION OF EXEMPLARY EMBODIMENTS

Hereinafter, preferable embodiments of the present disclosure will be described in detail.

Aqueous Ink Jet Composition

Incidentally, among various sublimation dyes, although being excellent in coloring property and the like, C.I. Solvent Yellow 160:1, C.I. Disperse Yellow 82, and C.I. Disperse Yellow 184 have the following problems. That is, in the past, when a dye which is at least one of C.I. Solvent Yellow 160:1, C.I. Disperse Yellow 82, and C.I. Disperse Yellow 184 is used as a constituent component of an aqueous ink jet composition, storage stability of this aqueous ink jet composition cannot be sufficiently improved, and hence, serious problems, such as apparent generation of foreign materials due to long-term storage, and clogging of a head filter and/or a nozzle in ink ejection by an ink jet method, have occurred.

Accordingly, in order to provide an aqueous ink jet composition capable of effectively preventing generation of the problems described above while excellent features of the dye are secured, intensive research was performed by the present inventor.

As a result, the present disclosure was finally made.

That is, an aqueous ink jet composition of the present disclosure comprises: at least one dye selected from the group consisting of C.I. Solvent Yellow 160:1, C.I. Disperse Yellow 82, and C.I. Disperse Yellow 184; a material A which is at least one compound selected from the group consisting of a compound represented by the following formula (1), a compound represented by the following formula (2), an ethylene oxide adduct of tristyrylphenol, a derivative of an ethylene oxide adduct of tristyrylphenol, a polyalkylene glycol, and a derivative of a polyalkylene glycol; and an anionic dispersant.

[Chem. 4]

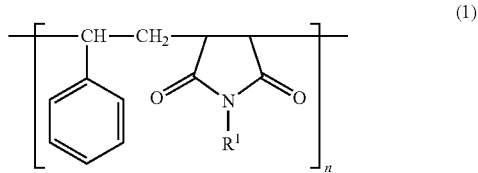
(1)

In the formula (1), $R^1$ represents a hydrocarbon group having six carbon atoms or less or $-(CH_2)_m-NR^8R^9$ (m represents an integer of six or less, and $R^8$ and $R^9$ each independently represent a hydrogen atom or a hydrocarbon group having six carbon atoms or less), and n represents an integer of one or more.

[Chem. 5]

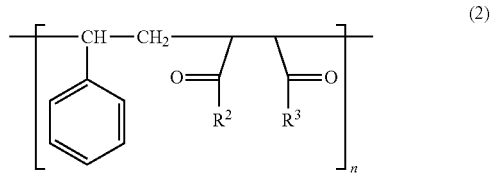
(2)

In the formula (2), one of $R^2$ and $R^3$ represents an —OH group, the other represents —$NR^4R^5$ ($R^4$ and $R^5$ each independently represent a hydrogen atom or a hydrocarbon group having six carbon atoms or less), and n represents an integer of one or more.

By the structure as described above, while the effect of the dye which is a dye excellent in color development in a low temperature process and the like is secured, an aqueous ink jet composition which suppresses apparent generation of foreign materials during the long-term storage and clogging of a head filter and/or a nozzle in ink ejection by an ink jet method can be provided.

On the other hand, when the condition as described above is not fulfilled, a satisfactory result cannot be obtained.

For example, when the material A is not used, the dispersion stability of the dye in an aqueous ink jet composition cannot be secured, and foreign materials are liable to be generated, for example, during the long-term storage of the aqueous ink jet composition.

In addition, when the anionic dispersant is not used, or when another dispersant, such as a nonionic dispersant or a cationic dispersant, is used instead of using the anionic dispersant, the dispersion stability of the dye in an aqueous ink jet composition cannot be secured, and foreign materials are liable to be generated, for example, during the long-term storage of the aqueous ink jet composition.

In addition, in this specification, the aqueous ink jet composition is a concept including, besides an ink itself to be ejected by an ink jet method, a stock solution to be used for preparation of the ink. In other words, the aqueous ink jet composition of the present disclosure may be a composition to be ejected by an ink jet method without any treatment or a composition to be ejected by an ink jet method after a treatment, such as a dilution treatment, is performed. In addition, in this specification, the aqueous ink jet composition is a composition containing at least water as a primary volatile liquid component, and the rate of the water in the volatile liquid component forming the aqueous ink jet composition is preferably 40 percent by mass or more, more preferably 50 percent by mass or more and further preferably 70 percent by mass or more.

Material A

The aqueous ink jet composition of the present disclosure contains the material A which is at least one compound selected from the group consisting of the compound represented by the above formula (1), the compound represented by the above formula (2), the ethylene oxide adduct of tristyrylphenol, the derivative of an ethylene oxide adduct of tristyrylphenol, the polyalkylene glycol, and the derivative of a polyalkylene glycol.

When being used in combination with the dye and the anionic dispersant, the material A is able to improve the dispersion stability of the dye in the aqueous ink jet composition and the storage stability thereof, and hence, apparent generation of foreign materials during the long-term storage and clogging of a head filter and/or a nozzle in ink ejection by an ink jet method can be effectively prevented. As a result, the ejection of the aqueous ink jet composition can be stably performed for a long time, and the quality of a recorded matter formed by an ink jet method can be stably improved. In addition, the material A is a component which protects the quality of the recorded matter and sublimation dyeing from being adversely influenced.

As the polyalkylene glycol, for example, there may be mentioned a polyoxyethylene, a polyoxypropylene, or a copolymer thereof.

As the derivative of a polyalkylene glycol, for example, an ether compound of the above polyalkylene glycol may be mentioned.

When the material A forming the aqueous ink jet composition is a material containing at least a polyalkylene glycol, although not particularly limited, the lower limit of the weight average weight molecular weight of the polyalkylene glycol is preferably 1,000, more preferably 5,000, and further preferably 10,000. In addition, when the material A forming the aqueous ink jet composition is a material containing at least a polyalkylene glycol, although not particularly limited, the upper limit of the weight average weight molecular weight of the polyalkylene glycol is preferably 20,000, more preferably 19,000, and further preferably 18,000.

Accordingly, the storage stability of the aqueous ink jet composition is further improved, and the generation of foreign materials, for example, during the long-term storage can be more effectively prevented.

The aqueous ink jet composition of the present disclosure may contain, as the material A, one type of compound or at least two types of compounds. In more particular, for example, the material A may be a mixture of the compound represented by the formula (1) and the compound represented by the formula (2).

Although not particularly limited, the lower limit of the content of the material A in the aqueous ink jet composition is preferably 0.05 percent by mass, more preferably 0.1 percent by mass, and further preferably 0.2 percent by mass. In addition, although not particularly limited, the upper limit of the content of the material A in the aqueous ink jet composition is preferably 10 percent by mass, more preferably 8 percent by mass, and further preferably 5 percent by mass.

Accordingly, the storage stability of the aqueous ink jet composition is further improved, and the generation of foreign materials, for example, during the long-term storage can be more effectively prevented.

In particular, when the aqueous ink jet composition is an ink itself to be ejected by an ink jet method, although not particularly limited, the lower limit of the content of the material A in the ink is preferably 0.05 percent by mass, more preferably 0.1 percent by mass, and further preferably 0.2 percent by mass. In addition, when the aqueous ink jet composition is an ink itself to be ejected by an ink jet method, although not particularly limited, the upper limit of the content of the material A in the ink is preferably 8.0 percent by mass, more preferably 5.0 percent by mass, and further preferably 1.0 percent by mass.

In addition, when the aqueous ink jet composition is a stock solution to be used for preparation of an ink ejected by an ink jet method, although not particularly limited, the lower limit of the content of the material A in the stock solution is preferably 0.1 percent by mass, more preferably 0.2 percent by mass, and further preferably 0.3 percent by mass. In addition, when the aqueous ink jet composition is a stock solution to be used for preparation of an ink ejected by an ink jet method, although not particularly limited, the upper limit of the content of the material A in the stock solution is preferably 10 percent by mass, more preferably 8 percent by mass, and further preferably 5 percent by mass.

In addition, when the material A forming the aqueous ink jet composition contains at least two types of compounds, as the content thereof, the sum of the contents of the at least two types of compounds is to be used.

Anionic Dispersant

The aqueous ink jet composition of the present disclosure contains the anionic dispersant.

Although the anionic dispersant is not particularly limited as long as being ionized into an anion, at least one of the compound represented by the following formula (3), a sodium salt of a naphthalenesulfonic acid formalin condensate, and a ligninsulfonic acid is preferable.

[Chem. 6]

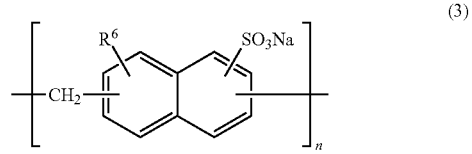

(3)

In the formula (3), $R^6$ represents a hydrocarbon group having four carbon atoms or less, and n represents an integer of one or more.

Accordingly, a hydrophobic property of the dispersant is improved, and adsorption of the dispersant to the dye is promoted, so that long-term stability of the aqueous ink jet composition is further improved.

Although $R^6$ in the formula (3) may be a hydrocarbon group having four carbon atoms or less, in particular, a hydrocarbon group having two carbon atoms or less is preferable.

Accordingly, the balance between the hydrophobic property and the hydrophilic property of the anionic dispersant can be made more preferable, and the dispersion stability of the dye in the aqueous ink jet composition can be further improved.

Although not particularly limited, the lower limit of a weight average molecular weight Mw of the anionic dispersant is preferably 1,000, more preferably 2,000, and further preferably 3,000. In addition, although not particularly limited, the upper limit of the weight average molecular weight Mw of the anionic dispersant is preferably 20,000, more preferably 10,000, and further preferably 5,000.

Accordingly, the storage stability of the aqueous ink jet composition is further improved, and the generation of foreign materials, for example, during the long-term storage can be more effectively prevented.

In addition, the aqueous ink jet composition may contain, as the anionic dispersant, at least two types of compounds.

Although not particularly limited, the lower limit of the content of the anionic dispersant in the aqueous ink jet composition is preferably 0.1 percent by mass, more preferably 1.0 percent by mass, and further preferably 2.0 percent by mass. In addition, although not particularly limited, the upper limit of the content of the anionic dispersant in the aqueous ink jet composition is preferably 30 percent by mass, more preferably 25 percent by mass, and further preferably 20 percent by mass.

Accordingly, the storage stability of the aqueous ink jet composition is further improved, and the generation of foreign materials, for example, during the long-term storage can be more effectively prevented.

In particular, when the aqueous ink jet composition is an ink itself to be ejected by an ink jet method, the lower limit of the content of the anionic dispersant in the ink is preferably 0.1 percent by mass, more preferably 1.0 percent by mass, and further preferably 2.0 percent by mass. In addition, when the aqueous ink jet composition is an ink itself to be ejected by an ink jet method, the upper limit of the content of the anionic dispersant in the ink is preferably 20 percent by mass, more preferably 15 percent by mass, and further preferably 10 percent by mass.

In addition, when the aqueous ink jet composition is a stock solution to be used for preparation of an ink ejected by an ink jet method, the lower limit of the content of the anionic dispersant in the stock solution is preferably 5.0 percent by mass, more preferably 7.0 percent by mass, and further preferably 10 percent by mass. In addition, when the aqueous ink jet composition is a stock solution to be used for preparation of an ink ejected by an ink jet method, the upper limit of the content of the anionic dispersant in the stock solution is preferably 30 percent by mass, more preferably 25 percent by mass, and further preferably 20 percent by mass.

In addition, when the anionic dispersant forming the aqueous ink jet composition contains at least two types of compounds, as the content thereof, the sum of the contents of the at least two types of compounds is to be used.

Dye

The aqueous ink jet composition contains at least one dye selected from the group consisting of C.I. Solvent Yellow 160:1, C.I. Disperse Yellow 82, and C.I. Disperse Yellow 184.

Although having similar color tones to each other, those three types of dyes can be appropriately used in combination to adjust a composition of the dye in accordance with a color tone required for the recorded matter. For example, the aqueous ink jet composition may contain at least two of the three types of the dyes described above.

Although not particularly limited, the lower limit of the average particle diameter of the dye in the aqueous ink jet composition is preferably 50 nm, more preferably 75 nm, and further preferably 100 nm. In addition, although not particularly limited, the upper limit of the average particle diameter of the dye in the aqueous ink jet composition is preferably 300 nm, more preferably 250 nm, and further preferably 200 nm.

Accordingly, the storage stability of the aqueous ink jet composition is further improved, and the generation of foreign materials, for example, during the long-term storage can be more effectively prevented. In addition, a recording portion formed using the aqueous ink jet composition can be more effectively sublimated, and the aqueous ink jet composition can be more preferably applied to the sublimation dyeing.

In addition, in this specification, the average particle diameter indicates a volume-based average particle diameter unless otherwise particularly noted. The average particle diameter may be obtained by measurement, for example, using a Microtrac UPA (manufactured by Nikkiso Co., Ltd.).

Although not particularly limited, the lower limit of the content of the dye in the aqueous ink jet composition is preferably 0.1 percent by mass, more preferably 2.0 percent by mass, and further preferably 3.0 percent by mass. In addition, although not particularly limited, the upper limit of the content of the dye in the aqueous ink jet composition is preferably 35 percent by mass, more preferably 25 percent by mass, and further preferably 20 percent by mass.

Accordingly, in a recording portion formed using the aqueous ink jet composition, a higher color density can be obtained, and in addition, the storage stability of the aqueous ink jet composition is further improved, and the generation of foreign materials, for example, during the long-term storage can be more effectively prevented.

In particular, when the aqueous ink jet composition is an ink itself to be ejected by an ink jet method, the lower limit of the content of the dye in the ink is preferably 0.1 percent by mass, more preferably 2.0 percent by mass, and further preferably 3.0 percent by mass. In addition, when the aqueous ink jet composition is an ink itself to be ejected by an ink jet method, the upper limit of the content of the dye in the ink is preferably 15 percent by mass, more preferably 10 percent by mass, and further preferably 8.0 percent by mass.

In addition, when the aqueous ink jet composition is a stock solution to be used for preparation of an ink ejected by an ink jet method, the lower limit of the content of the dye in the stock solution is preferably 7.0 percent by mass, more preferably 10 percent by mass, and further preferably 12 percent by mass. In addition, when the aqueous ink jet composition is a stock solution to be used for preparation of an ink ejected by an ink jet method, the upper limit of the content of the dye in the stock solution is preferably 35 percent by mass, more preferably 25 percent by mass, and further preferably 20 percent by mass.

As the dye contained in the aqueous ink jet composition, at least one selected from the group consisting of C.I. Solvent Yellow 160:1, C.I. Disperse Yellow 82, and C.I. Disperse Yellow 184 may be used, and C.I. Solvent Yellow 160:1 is preferably at least contained and is more preferably contained as a primary component.

Accordingly, in a recording portion formed using the aqueous ink jet composition, a higher color density can be obtained, and in addition, the storage stability of the aqueous ink jet composition is further improved, and the generation of foreign materials, for example, during the long-term storage can be more effectively prevented.

The rate of C.I. Solvent Yellow 160:1 in the dye contained in the aqueous ink jet composition is preferably 50 percent by mass or more, more preferably 80 percent by mass or more, and further preferably 90 percent by mass or more.

Accordingly, the effect described above can be more significantly obtained.

Although not particularly limited, the lower limit of the content of C.I. Solvent Yellow 160:1 in the aqueous ink jet composition is preferably 0.1 percent by mass, more preferably 2.0 percent by mass, and further preferably 3.0 percent by mass. In addition, although not particularly limited, the upper limit of the content of C.I. Solvent Yellow 160:1 in the aqueous ink jet composition is preferably 30 percent by mass, more preferably 22 percent by mass, and further preferably 20 percent by mass.

Accordingly, in a recording portion formed using the aqueous ink jet composition, a higher color density can be obtained, and in addition, the storage stability of the aqueous ink jet composition is further improved, and the generation of foreign materials, for example, during the long-term storage can be more effectively prevented.

In particular, when the aqueous ink jet composition is an ink itself to be ejected by an ink jet method, the lower limit of the content of C.I. Solvent Yellow 160:1 in the ink is preferably 0.1 percent by mass, more preferably 2.0 percent by mass, and further preferably 3.0 percent by mass. In addition, when the aqueous ink jet composition is an ink itself to be ejected by an ink jet method, although not particularly limited, the upper limit of the content of C.I. Solvent Yellow 160:1 in the ink is preferably 12 percent by mass, more preferably 9.0 percent by mass, and further preferably 8.0 percent by mass.

In addition, when the aqueous ink jet composition is a stock solution to be used for preparation of an ink ejected by an ink jet method, the lower limit of the content of C.I. Solvent Yellow 160:1 in the stock solution is preferably 7.0 percent by mass, more preferably 10 percent by mass, and further preferably 12 percent by mass. In addition, when the aqueous ink jet composition is a stock solution to be used for preparation of an ink ejected by an ink jet method, the upper limit of the content of C.I. Solvent Yellow 160:1 in the stock solution is preferably 30 percent by mass, more preferably 22 percent by mass, and further preferably 20 percent by mass.

In addition, in the case in which the dye forming the aqueous ink jet composition contains at least C.I. Solvent Yellow 160:1, when the content of C.I. Solvent Yellow 160:1 in the aqueous ink jet composition is represented by XD [percent by mass], and the content of the material A therein is represented by XA [percent by mass], although not particularly limited, the lower limit of XA/XD is preferably 0.05, more preferably 0.06, and further preferably 0.07. In addition, although not particularly limited, the upper limit of XA/XD is preferably 1.0, more preferably 0.8, and further preferably 0.5.

Accordingly, the storage stability of the aqueous ink jet composition is further improved, and the generation of foreign materials, for example, during the long-term storage can be more effectively prevented.

In addition, in the case in which the dye forming the aqueous ink jet composition contains at least C.I. Solvent Yellow 160:1, when the content of C.I. Solvent Yellow 160:1 in the aqueous ink jet composition is represented by XD [percent by mass], and the content of the anionic dispersant therein is represented by XB [percent by mass], although not particularly limited, the lower limit of XB/XD is preferably 0.4, more preferably 0.5, and further preferably 0.6. In addition, although not particularly limited, the upper limit of XB/XD is preferably 2.0, more preferably 1.5, and further preferably 1.2.

Accordingly, the storage stability of the aqueous ink jet composition is further improved, and the generation of foreign materials, for example, during the long-term storage can be more effectively prevented.

In the aqueous ink jet composition, when the content of the material A is represented by XA [percent by mass], and the content of the anionic dispersant is represented by XB [percent by mass], although not particularly limited, the lower limit of XA/XB is preferably 0.02, more preferably 0.03, and further preferably 0.05. In addition, although not particularly limited, the upper limit of XA/XB is preferably 1.5, more preferably 0.8, and further preferably 0.5.

Accordingly, the storage stability of the aqueous ink jet composition is further improved, and the generation of foreign materials, for example, during the long-term storage can be more effectively prevented.

Water

The aqueous ink jet composition contains water. As this water, for example, purified water, such as reverse osmosis (RO) water, distilled water, or ion-exchanged water, may be used.

Although not particularly limited, the lower limit of the content of the water in the aqueous ink jet composition is preferably 30 percent by mass, more preferably 35 percent by mass, and further preferably 40 percent by mass. In addition, although not particularly limited, the upper limit of the content of the water in the aqueous ink jet composition is preferably 85 percent by mass, more preferably 80 percent by mass, and further preferably 75 percent by mass.

Accordingly, the viscosity of the aqueous ink jet composition can be more reliably controlled at a preferable value, and the ejection stability by an ink jet method can be further improved.

Cumarin Compound Having Sulfo Group

The aqueous ink jet composition may further contain a cumarin compound having a chemical structure of at least one of a sulfo group and a salt thereof.

Accordingly, the storage stability of the aqueous ink jet composition is further improved, and the generation of foreign materials, for example, during the long-term storage can be more effectively prevented.

As the cumarin compound having a chemical structure of at least one of a sulfo group and a salt thereof, although any compound having, besides a cumarin skeleton, a chemical structure of at least one of a sulfo group and a salt thereof may be used, at least one compound selected from the group consisting of C.I. Acid Yellow 184 and C.I. Acid Yellow 250 is preferable.

Accordingly, the storage stability of the aqueous ink jet composition is further improved, and the generation of foreign materials, for example, during the long-term storage can be more effectively prevented.

In addition, in this specification, the cumarin compound indicates a compound having the structure in which at least one hydrogen atom of the cumarin represented by the following formula (6) is substituted by another atom or an atom group.

[Chem. 7]

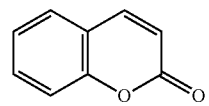

(6)

When the aqueous ink jet composition contains a cumarin compound having a sulfo group, although not particularly limited, the lower limit of the content of the cumarin compound having a sulfo group in the aqueous ink jet composition is preferably 0.1 percent by mass, more preferably 0.3 percent by mass, and further preferably 0.5 percent by mass. In addition, although not particularly limited, the upper limit of the content of the cumarin compound having a sulfo group in the aqueous ink jet composition is preferably 20 percent by mass, more preferably 10 percent by mass, and further preferably 7.0 percent by mass.

Accordingly, in a recording portion formed using the aqueous ink jet composition, a higher color density can be obtained, and in addition, the storage stability of the aqueous ink jet composition is further improved, and the generation of foreign materials, for example, during the long-term storage can be more effectively prevented.

In particular, when the aqueous ink jet composition is an ink itself to be ejected by an ink jet method, the lower limit of the content of the cumarin compound having a sulfo group in the ink is preferably 0.1 percent by mass, more preferably 0.3 percent by mass, and further preferably 0.5 percent by mass. In addition, when the aqueous ink jet composition is an ink itself to be ejected by an ink jet method, the upper limit of the content of the cumarin compound having a sulfo group in the ink is preferably 10 percent by mass, more preferably 5.0 percent by mass, and further preferably 3.0 percent by mass.

In addition, when the aqueous ink jet composition is a stock solution to be used for preparation of an ink ejected by an ink jet method, the lower limit of the content of the cumarin compound having a sulfo group in the stock solution is preferably 0.5 percent by mass, more preferably 1.0 percent by mass, and further preferably 1.5 percent by mass. In addition, when the aqueous ink jet composition is a stock solution to be used for preparation of an ink ejected by an ink jet method, the upper limit of the content of the cumarin compound having a sulfo group in the stock solution is preferably 20 percent by mass, more preferably 10 percent by mass, and further preferably 7.0 percent by mass.

Solvent Other than Water

The aqueous ink jet composition may contain a solvent other than the water.

Accordingly, the viscosity of the aqueous ink jet composition can be preferably adjusted, and a moisture-retention property of the aqueous ink jet composition can be improved. As a result, liquid drop ejection by an ink jet method can be more stably performed.

As the solvent other than the water contained in the aqueous ink jet composition, for example, glycerin, propylene glycol, or 2-pyrrolidone may be mentioned.

Since at least one of those solvents is contained, an evaporation rate can be decreased because of an excellent moisture-retention property, and hence, stabler liquid drop ejection can be performed.

Although not particularly limited, the lower limit of the content of the solvent other than the water contained in the aqueous ink jet composition is preferably 0 percent by mass, more preferably 10 percent by mass, and further preferably 15 percent by mass. In addition, although not particularly limited, the upper limit of the content of the solvent other than the water contained in the aqueous ink jet composition is preferably 45 percent by mass, more preferably 43 percent by mass, and further preferably 40 percent by mass.

Accordingly, the effect of the solvent other than the water described above can be more significantly obtained.

Surfactant

The aqueous ink jet composition may also contain a surfactant.

Accordingly, wettability of the aqueous ink jet composition to a recording medium can be further improved, and hence, a more preferable image quality can be advantageously obtained.

As the surfactant contained in the aqueous ink jet composition, for example, various types of surfactants, such as an anionic surfactant, a cationic surfactant, and a nonionic surfactant, may be used.

In more particular, as the surfactant contained in the aqueous ink jet composition, for example, an acetylene-based surfactant, a silicone-based surfactant, or a fluorine-based surfactant may be mentioned.

When the aqueous ink jet composition contains a silicone-based surfactant, the wettability of the aqueous ink jet composition to a recording medium can be further improved, and a recording portion having a more excellent tone gradation property can be formed.

When the aqueous ink jet composition contains a silicone-based surfactant, although not particularly limited, the lower limit of the content of the silicone-based surfactant in the aqueous ink jet composition is with respect to 100 parts by mass of the dye, preferably 5.0 parts by mass, more preferably 7.0 parts by mass, and further preferably 10 parts by mass. Although not particularly limited, the upper limit of the content of the silicone-based surfactant in the aqueous ink jet composition is with respect to 100 parts by mass of thedye, preferably 150 parts by mass, more preferably 140 parts by mass, and further preferably 70 parts by mass.

Accordingly, the effect of the silicone-based surfactant described above can be more significantly obtained.

As a commercially available silicone-based surfactant, for example, there may be mentioned BYK-306, BYK-307, BYK-333, BYK-337, BYK-341, BYK-345, BYK-346, BYK-347, BYK-348, BYK-349, or BYK-378 (trade name, manufactured by BYK Japan KK); or KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.).

Other Components

The aqueous ink jet composition may also contain at least one component other than the components described above. Hereinafter, the component as described above may also be called other components.

As the other components, for example, there may be mentioned a coloring agent other than the dye; a dispersant other than that described above; a penetrant, such as triethylene glycol monomethyl ether, triethylene glycol monobutyl ether, diethylene glycol monomethyl ether, 1,2-hexanediol, 1,2-pentandiol, 1,2-butanediol, or 3-methyl-1,5-penetandiol; a pH adjuster, a chelating agent, such as ethylenediaminetetraacetic acid salt, a fungicide/antiseptic agent, and/or a antirust agent. As the fungicide/antiseptic agent, for example, a compound having in its molecule, an isothiazolin cyclic structure may be preferably used.

The content of the other components is preferably 6 percent by mass or less and more preferably 5 percent by mass or less. In addition, as the other components, when at least two types of components are contained, the sum of the contents thereof preferably satisfies the above condition.

In particular, when the aqueous ink jet composition of the present disclosure contains a dispersant other than that described above, the content of this dispersant is preferably 5 percent by mass or less and more preferably 3 percent by mass or less.

Although not particularly limited, the lower limit of the surface tension of the aqueous ink jet composition at 25° C. is preferably 20 mN/m, more preferably 21 mN/m, and further preferably 23 mN/m. In addition, although not particularly limited, the upper limit of the surface tension of the aqueous ink jet composition at 25° C. is preferably 50 mN/m, more preferably 40 mN/m, and further preferably 30 mN/m.

Accordingly, for example, clogging of a nozzle of an ejection device by an ink jet method is more unlikely to occur, and the ejection stability of the aqueous ink jet composition is further improved. In addition, even if the clogging of a nozzle occurs, when the nozzle is capped, that is, when capping is performed, the recovery property can be further improved.

In addition, as the surface tension, a value measured by Wilhelmy method may be used. For the measurement of the surface tension, for example, a surface tension meter, such as CBVP-7 manufactured by Kyowa Interface Science Co., Ltd., may be used.

Although not particularly limited, the lower limit of the viscosity of the aqueous ink jet composition at 25° C. is preferably 2 mPa·s, more preferably 3 mPa·s, and further preferably 4 mPa·s. In addition, although not particularly limited, the upper limit of the viscosity of the aqueous ink jet composition at 25° C. is preferably 30 mPa·s, more preferably 20 mPa·s, and further preferably 10 mPa·s.

Accordingly, the ejection stability of the aqueous ink jet composition is further improved.

In addition, the viscosity can be measured at 25° C. using a viscoelastic tester, such as MCR-300 manufactured by Pysica, such that the shear rate is increased from 10 $[s^{-1}]$ to 1,000 $[s^{-1}]$, and a viscosity at a shear rate of 200 is read.

When the aqueous ink jet composition of the present disclosure is an ink, in general, this ink is received in a container, such as a cartridge, a bag, or a tank, and is then applied to a recording apparatus by an ink jet method. In other words, the recording apparatus according to the present disclosure includes a container, such as an ink cartridge, receiving the aqueous ink jet composition of the present disclosure as an ink.

The aqueous ink jet composition of the present disclosure may be an ink to be ejected by an ink jet method or a stock solution to be used for preparation of the ink, and although a concrete structure of a device which ejects liquid droplets is not limited, the aqueous ink jet composition of the present disclosure is preferably applied to an air open-type recording apparatus and, in more particular, to an ink jet recording apparatus which includes, for example, an ink container having an ink charge port through which an ink can be replenished and a recording head having nozzle holes which eject the ink described above.

In the recording apparatus as described above, when an ink containing the dye is used, since the ink is in contact with the air, a problem in that foreign materials are particularly liable to be generated at a gas-liquid interface may arise; however, according to the present disclosure, even when the above ink containing the dye is applied to the recording apparatus as described above, the problem as described above can be effectively prevented from being generated. That is, when the aqueous ink jet composition of the present disclosure is applied to an air open-type recording apparatus, the advantage of the present disclosure can be more significantly obtained.

Recording Method

Although the aqueous ink jet composition of the present disclosure may be applied, for example, to a direct printing method or a thermal transfer printing method, such as sublimation dyeing, since the dye has a sublimation property, the aqueous ink jet composition of the present disclosure can be preferably applied to a thermal transfer printing method.

Hereinafter, as a recording method using the aqueous ink jet composition of the present disclosure, a thermal transfer printing method, in particular one example of the sublimation dyeing, will be described.

A recording method of this embodiment includes an ink adhesion step of adhering an aqueous ink jet composition to an intermediate transfer medium by an ink jet method and a transfer step of heating the intermediate transfer medium to which the aqueous ink jet composition is adhered to transfer a dye contained in the aqueous ink jet composition as a sublimation dye to a recording medium.

Ink Adhesion Step

In the ink adhesion step, by an ink jet method, the aqueous ink jet composition is adhered to the intermediate transfer medium. The ejection of the aqueous ink jet composition by an ink jet method can be performed using a known ink jet recording apparatus. As an ejection method, for example, there may be used a piezoelectric method or a method in which an ink is ejected by bubbles generated by heating the ink. In particular, for example, since deterioration of the aqueous ink jet composition hardly occurs, a piezoelectric method is preferable.

In the ink adhesion step, an ink other than the aqueous ink jet composition according to the present disclosure may also be used in combination.

Intermediate Transfer Medium

As the intermediate transfer medium, for example, paper, such as regular paper, or a recording medium provided with an ink receiving layer may be used, and in more particular, for example, ink jet exclusive paper or a recording medium called coat paper or the like may be used. Among those mentioned above, paper provided with an ink receiving layer formed of inorganic particles, such as silica, is preferable. Accordingly, in a step in which the aqueous ink jet composition adhered to the intermediate transfer medium is dried, an intermediate transfer medium in which, for example, blurring is suppressed can be obtained. In addition, in the following transfer step, the sublimation of the dye tends to be more smoothly performed.

Transfer Step

Subsequently, the intermediate transfer medium to which the aqueous ink jet composition is adhered is heated, and the dye used as a constituent element of the aqueous ink jet composition is transferred to the recording medium. As a result, a recorded matter is obtained.

Although not particularly limited, the lower limit of a heating temperature in this step is preferably 160° C. and more preferably 170° C. In addition, although not particularly limited, the upper limit of the heating temperature in this step is preferably 220° C. and more preferably 200° C.

Accordingly, energy required for the transfer can be further decreased, and the productivity of the recorded matter can be further improved. In addition, the coloring property of the recorded matter thus obtained can be further improved.

Although depending on the heating temperature, the lower limit of a heating time in this step is preferably 30 seconds and more preferably 45 seconds. In addition, the upper limit of the heating time in this step is preferably 90 seconds and more preferably 80 seconds.

Accordingly, the energy required for the transfer can be further decreased, and the productivity of the recorded matter can be further improved. In addition, the coloring property of the recorded matter thus obtained can be further improved.

In addition, this step may be performed such that the surface of the intermediate transfer medium to which the aqueous ink jet composition is adhered is heated while being separated from the recording medium by a predetermined distance or while being in close contact with the surface of the recording medium; however, this step is preferably performed in the state in which the surface of the intermediate transfer medium to which the aqueous ink jet composition is adhered is in close contact with the surface of the recording medium.

Accordingly, the energy required for the transfer can be further decreased, and the productivity of the recorded matter can be further improved. In addition, the coloring property of the recorded matter thus obtained can be further improved.

Recording Medium

Although the recording medium is not particularly limited, for example, there may be mentioned a cloth, such as a hydrophobic fiber cloth, a resin film, paper, glass, a metal, or a ceramic. In addition, as the recording medium, a material having a steric shape, such as a sheet shape, a spherical shape, or a rectangular parallelepiped shape, may also be used.

When the recording medium is a cloth, as fibers forming the cloth, for example, there may be mentioned polyester fibers, nylon fibers, triacetate fibers, diacetate fibers, polyamide fibers, or a blend using at least two types of the fibers mentioned above. In addition, there may also be used a blend using the fibers mentioned above with regenerated fibers, such as rayon, or a blend using the fibers mentioned above with natural fibers, such as cotton, silk, or wool.

In addition, when the recording medium is a resin film, as the resin film mentioned above, for example, a polyester film, a polyurethane film, a polycarbonate film, a poly(phenylene sulfide) film, a polyimide film, or a poly(amide imide) film may be mentioned.

In addition, the resin film may be a laminate formed by laminating a plurality of layers or may be a gradient material in which the composition of a material is gradiently changed.

Heretofore, although the preferable embodiments of the present disclosure have been described, the present disclosure is not limited thereto.

For example, the aqueous ink jet composition of the present disclosure may be a composition to be ejected by an ink jet method and may be a composition not applied to the recording method as described above.

For example, the aqueous ink jet composition of the present disclosure may also be a composition to be applied to a method including, besides the steps described above, at least one another step.

In the case described above, as a pre-treatment step, for example, a step of applying a coat layer to the recording medium may be mentioned.

In addition, as an intermediate treatment step, for example, a step of pre-heating the recording medium may be mentioned. In addition, as a post-treatment step, for example, a step of washing the recording medium may be mentioned.

In addition, the aqueous ink jet composition of the present disclosure can also be preferably applied to sublimation transfer which uses no intermediate transfer medium. As the sublimation transfer which uses no intermediate transfer medium, for example, there may be mentioned a method including a step of adhering an aqueous ink jet composition by an ink jet method to a strippable ink receiving layer provided on a recording medium; a step of heating the above recording medium which is provided with the ink receiving layer to which the aqueous ink jet composition is adhered so as to perform sublimation diffusion dyeing from the ink receiving layer to the recording medium disposed thereunder; and a step of peeling off the ink receiving layer from the recording medium to obtain a recorded matter.

EXAMPLES

Next, concrete examples of the present disclosure will be described.

1. Preparation of Stock Solution for Ink-Jet Ink Production as Aqueous Ink Jet Composition Example A1

First, C.I. Solvent Yellow 160:1 as the dye; an ethylene oxide adduct of tristyrylphenol as the material A; a sodium salt of a methylnaphthalenesulfonic acid formalin condensate as the anionic dispersant; and purified water were mixed together at a ratio shown in Table 3, and a mixture thus obtained was stirred at 3,000 rpm by a high shear mixer (manufactured by Silverson) to form a slurry. The ethylene oxide adduct of tristyrylphenol used in this example was a substance in which $R^7$ of the formula (4) was H. In addition, the sodium salt of a methylnaphthalenesulfonic acid formalin condensate used in this example was a substance in which $R^6$ of the formula (3) was —$CH_3$.

Subsequently, the slurry thus formed was stirred and dispersed together with glass beads having a diameter of 0.5 mm by a bead mill (LMZ015, manufactured by Ashizawa Finetech Ltd.) in a water cooling atmosphere, so that a stock solution for ink-jet ink production was formed as an aqueous ink jet composition.

The average particle diameter of the dye in the stock solution for ink-jet ink production was 150 nm.

Examples A2 to A35

Except for that the types of dye, material A, and anionic dispersant and the blending ratio between the components were set as shown in Tables 1, 2, 3, and 4, a stock solution for ink-jet ink production as the aqueous ink jet composition was formed in a manner similar to that of Example A1.

Comparative Examples A1 to A5

Except for that the types of components and the blending ratio between the components were set as shown in Tables 1, 2, and 4, a stock solution for ink-jet ink production as the aqueous ink jet composition was formed in a manner similar to that of Example A1.

The relationship between the abbreviation and the condition of the material A used for preparation of the stock solution for ink-jet ink production of each of Examples and Comparative Examples is shown in Table 1, the relationship between the abbreviation and the condition of the dispersant is shown in Table 2, and the composition of the stock solution for ink-jet ink production of each of Examples and Comparative Examples is shown in Tables 3 and 4. In addition, in the tables, C.I. Solvent Yellow 160:1 is represented by "SY160:1", C.I. Disperse Yellow 82 is represented by "DY82", C.I. Disperse Yellow 184 is represented by "DY184", C.I. Disperse Yellow 54 is represented by "DY54", C.I. Acid Yellow 184 as a cumarin compound having a sulfo group is represented by "AY184", C.I. Acid Yellow 250 as a cumarin compound having a sulfo group is represented by "AY250", a polycarboxylic acid-based activator (Carrybon L-400, manufactured by Sanyo Chemical Industries, Ltd.) is represented by "A1'", and a polyoxyethylene sorbitan fatty acid ester (Solbon T-40, manufactured by Toho Chemical Industry Co., Ltd.) as a nonionic dispersant is represented by "B1'". In addition, A3 functioning as the material A used in Example A3 is represented by the following formula (5). In addition, the stock solution for ink-jet ink production of each of Examples A1 to A35 had a viscosity in a range of 2.0 to 30 mPa·s, and the surface tension thereof was in a range of 25 to 60 mN/m. In addition, the viscosity was measured at 25° C. using a viscoelastic tester MCR-300 (manufactured by Pysica) such that the shear rate was increased from 10 [s$^{-1}$] to 1,000 [s$^{-1}$], and a viscosity at a shear rate of 200 was read. In addition, the surface tension was measured at 25° C. by Wilhelmy method using a surface tension meter (CBVP-7, manufactured by Kyowa Interface Science Co., Ltd.).

[Chem. 8]

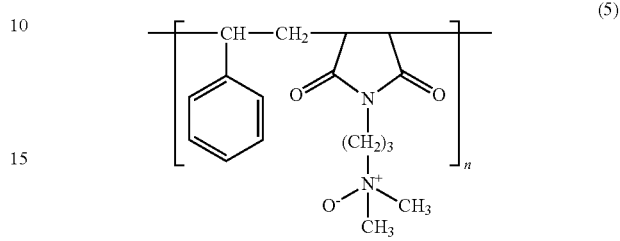

(5)

TABLE 1

| ABBREVIATION OF MATERIAL A | CHEMICAL FORMULA | CONDITION IN FORMULA |
| --- | --- | --- |
| A1 | FORMULA (4) | $R^7$=H |
| A2 | FORMULA (4) | $R^7$=SO$_3$H |
| A3 | FORMULA (1) | $R^1$=(CH$_2$)$_3$N$^+$(CH$_3$)$_2$O$^-$ |
| A4 | FORMULA (2) | ONE OF $R^2$ AND $R^3$ IS —OH, THE OTHER IS —N(CH$_2$)$_3$N(CH$_3$)$_2$O—. |
| A5 | FORMULA (6) | NEWPOL PE-108 MW: 16,000 |
| A6 | FORMULA (6) | NEWPOL PE-68 MW: 8,000 |
| A7 | FORMULA (6) | NEWPOL PE-34 MW: 1,700 |
| A8 | FORMULA (6) | NEWPOL PE-128 MW: 20000 |
| A9 | FORMULA (7) | NIKKOL PBC-34 |

TABLE 2

| ABBREVIATION OF ANIONIC DISPERSANT | CHEMICAL FORMULA OR MATERIAL NAME | CONDITION IN FORMULA | Mw |
| --- | --- | --- | --- |
| B1 | FORMULA (3) | $R^6$=CH$_3$ | 5000 |
| B2 | FORMULA (3) | $R^6$=CH$_2$CH$_3$ | 5000 |
| B3 | FORMULA (3) | $R^6$=CH$_2$CH$_2$CH$_3$ | 5000 |
| B4 | FORMULA (3) | $R^6$=CH$_2$CH$_2$CH$_2$CH$_3$ | 5000 |
| B5 | SODIUM SALT OF NAPHTHALENESULFONIC ACID FORMALIN CONDENSATE | — | 5000 |
| B6 | LIGNINSULFONIC ACID | — | 5000 |

TABLE 3

| | BLENDING AMOUNT [PARTS BY MASS] | | | | | | | | | | | | | | | | | | |
| --- | --- | --- | --- | --- | --- | --- | --- | --- | --- | --- | --- | --- | --- | --- | --- | --- | --- | --- | --- |
| | DYE | | | | MATERIAL A | | | | | | | | | ANIONIC DISPERSANT | | | | | |
| | SY 160:1 | DY 82 | DY 184 | DY 54 | A1 | A2 | A3 | A4 | A5 | A6 | A7 | A8 | A9 | B1 | B2 | B3 | B4 | B5 | B6 |
| EXAMPLE A1 | 15 | 0 | 0 | 0 | 1 | 0 | 0 | 0 | 0 | 0 | 0 | 0 | 0 | 15 | 0 | 0 | 0 | 0 | 0 |
| EXAMPLE A2 | 15 | 0 | 0 | 0 | 0 | 1 | 0 | 0 | 0 | 0 | 0 | 0 | 0 | 15 | 0 | 0 | 0 | 0 | 0 |
| EXAMPLE A3 | 15 | 0 | 0 | 0 | 0 | 0 | 1 | 0 | 0 | 0 | 0 | 0 | 0 | 15 | 0 | 0 | 0 | 0 | 0 |
| EXAMPLE A4 | 15 | 0 | 0 | 0 | 0 | 0 | 0 | 1 | 0 | 0 | 0 | 0 | 0 | 15 | 0 | 0 | 0 | 0 | 0 |
| EXAMPLE A5 | 15 | 0 | 0 | 0 | 0 | 0 | 0 | 0 | 1 | 0 | 0 | 0 | 0 | 15 | 0 | 0 | 0 | 0 | 0 |
| EXAMPLE A6 | 15 | 0 | 0 | 0 | 0 | 0 | 0 | 0 | 0 | 1 | 0 | 0 | 0 | 15 | 0 | 0 | 0 | 0 | 0 |
| EXAMPLE A7 | 15 | 0 | 0 | 0 | 0 | 0 | 0 | 0 | 1 | 0 | 0 | 0 | 0 | 0 | 15 | 0 | 0 | 0 | 0 |
| EXAMPLE A8 | 15 | 0 | 0 | 0 | 0 | 0 | 0 | 0 | 1 | 0 | 0 | 0 | 0 | 0 | 0 | 15 | 0 | 0 | 0 |
| EXAMPLE A9 | 15 | 0 | 0 | 0 | 0 | 0 | 0 | 0 | 1 | 0 | 0 | 0 | 0 | 0 | 0 | 0 | 15 | 0 | 0 |

TABLE 3-continued

| | | | | | | | | | | | | | | | | | | | |
|---|---|---|---|---|---|---|---|---|---|---|---|---|---|---|---|---|---|---|---|
| EXAMPLE A10 | 15 | 0 | 0 | 0 | 0 | 0 | 0 | 0 | 1 | 0 | 0 | 0 | 0 | 0 | 0 | 0 | 0 | 15 | 0 |
| EXAMPLE A11 | 15 | 0 | 0 | 0 | 0 | 0 | 0 | 0 | 1 | 0 | 0 | 0 | 0 | 0 | 0 | 0 | 0 | 0 | 15 |
| EXAMPLE A12 | 15 | 0 | 0 | 0 | 0 | 0 | 0 | 0 | 0.05 | 0 | 0 | 0 | 0 | 15 | 0 | 0 | 0 | 0 | 0 |
| EXAMPLE A13 | 15 | 0 | 0 | 0 | 0 | 0 | 0 | 0 | 0.75 | 0 | 0 | 0 | 0 | 15 | 0 | 0 | 0 | 0 | 0 |
| EXAMPLE A14 | 7.5 | 0 | 0 | 0 | 0 | 0 | 0 | 0 | 7.5 | 0 | 0 | 0 | 0 | 7.5 | 0 | 0 | 0 | 0 | 0 |
| EXAMPLE A15 | 7.5 | 0 | 0 | 0 | 0 | 0 | 0 | 0 | 10 | 0 | 0 | 0 | 0 | 7.5 | 0 | 0 | 0 | 0 | 0 |
| EXAMPLE A16 | 15 | 0 | 0 | 0 | 0 | 0 | 0 | 0 | 1 | 0 | 0 | 0 | 0 | 5 | 0 | 0 | 0 | 0 | 0 |
| EXAMPLE A17 | 15 | 0 | 0 | 0 | 0 | 0 | 0 | 0 | 1 | 0 | 0 | 0 | 0 | 6 | 0 | 0 | 0 | 0 | 0 |
| EXAMPLE A18 | 7.5 | 0 | 0 | 0 | 0 | 0 | 0 | 0 | 1 | 0 | 0 | 0 | 0 | 15 | 0 | 0 | 0 | 0 | 0 |
| EXAMPLE A19 | 7.5 | 0 | 0 | 0 | 0 | 0 | 0 | 0 | 1 | 0 | 0 | 0 | 0 | 20 | 0 | 0 | 0 | 0 | 0 |
| EXAMPLE A20 | 15 | 0 | 0 | 0 | 0 | 0 | 0 | 0 | 0.05 | 0 | 0 | 0 | 0 | 15 | 0 | 0 | 0 | 0 | 0 |

| | BLENDING AMOUNT [PARTS BY MASS] | | | | | | | |
|---|---|---|---|---|---|---|---|---|
| | CUMARIN COMPOUND | | OTHER COMPONENTS | | PURIFIED WATER | | | |
| | AY 184 | AY 250 | A1' | B1' | | XA/XD | XB/XD | XA/XB |
| EXAMPLE A1 | 0 | 0 | 0 | 0 | 69 | 0.07 | 1.00 | 0.07 |
| EXAMPLE A2 | 0 | 0 | 0 | 0 | 67 | 0.07 | 1.00 | 0.07 |
| EXAMPLE A3 | 0 | 0 | 0 | 0 | 68 | 0.07 | 1.00 | 0.07 |
| EXAMPLE A4 | 0 | 0 | 0 | 0 | 67 | 0.07 | 1.00 | 0.07 |
| EXAMPLE A5 | 0 | 0 | 0 | 0 | 69 | 0.07 | 1.00 | 0.07 |
| EXAMPLE A6 | 0 | 0 | 0 | 0 | 69 | 0.07 | 1.00 | 0.07 |
| EXAMPLE A7 | 0 | 0 | 0 | 0 | 69 | 0.07 | 1.00 | 0.07 |
| EXAMPLE A8 | 0 | 0 | 0 | 0 | 69 | 0.07 | 1.00 | 0.07 |
| EXAMPLE A9 | 0 | 0 | 0 | 0 | 69 | 0.07 | 1.00 | 0.07 |
| EXAMPLE A10 | 0 | 0 | 0 | 0 | 69 | 0.07 | 1.00 | 0.07 |
| EXAMPLE A11 | 0 | 0 | 0 | 0 | 69 | 0.07 | 1.00 | 0.07 |
| EXAMPLE A12 | 0 | 0 | 0 | 0 | 69.95 | 0.003 | 1.00 | 0.003 |
| EXAMPLE A13 | 0 | 0 | 0 | 0 | 69.25 | 0.05 | 1.00 | 0.05 |
| EXAMPLE A14 | 0 | 0 | 0 | 0 | 77.5 | 1.00 | 1.00 | 1.00 |
| EXAMPLE A15 | 0 | 0 | 0 | 0 | 75 | 1.33 | 1.00 | 1.33 |
| EXAMPLE A16 | 0 | 0 | 0 | 0 | 79 | 0.07 | 0.33 | 0.20 |
| EXAMPLE A17 | 0 | 0 | 0 | 0 | 78 | 0.07 | 0.40 | 0.17 |
| EXAMPLE A18 | 0 | 0 | 0 | 0 | 76.5 | 0.13 | 2.00 | 0.07 |
| EXAMPLE A19 | 0 | 0 | 0 | 0 | 71.5 | 0.13 | 2.67 | 0.05 |
| EXAMPLE A20 | 0 | 0 | 0 | 0 | 69.95 | 0.003 | 1.00 | 0.003 |

TABLE 4

| | BLENDING AMOUNT [PARTS BY MASS] | | | | | | | | | | | | | | | | | | | | |
|---|---|---|---|---|---|---|---|---|---|---|---|---|---|---|---|---|---|---|---|---|---|
| | DYE | | | | MATERIAL A | | | | | | | | | ANIONIC DISPERSANT | | | | | | |
| | SY 160:1 | DY 82 | DY 184 | DY 54 | A1 | A2 | A3 | A4 | A5 | A6 | A7 | A8 | A9 | B1 | B2 | B3 | B4 | B5 | B6 |
| EXAMPLE A21 | 15 | 0 | 0 | 0 | 0 | 0 | 0 | 0 | 0.3 | 0 | 0 | 0 | 0 | 15 | 0 | 0 | 0 | 0 | 0 |
| EXAMPLE A22 | 15 | 0 | 0 | 0 | 0 | 0 | 0 | 0 | 7.5 | 0 | 0 | 0 | 0 | 5 | 0 | 0 | 0 | 0 | 0 |
| EXAMPLE A23 | 15 | 0 | 0 | 0 | 0 | 0 | 0 | 0 | 10 | 0 | 0 | 0 | 0 | 5 | 0 | 0 | 0 | 0 | 0 |
| EXAMPLE A24 | 15 | 0 | 0 | 0 | 0 | 0 | 0 | 0 | 0 | 0 | 1 | 0 | 0 | 15 | 0 | 0 | 0 | 0 | 0 |
| EXAMPLE A25 | 15 | 0 | 0 | 0 | 0 | 0 | 0 | 0 | 0 | 0 | 0 | 1 | 0 | 15 | 0 | 0 | 0 | 0 | 0 |
| EXAMPLE A26 | 0.1 | 0 | 0 | 0 | 0 | 0 | 0 | 0 | 1 | 0 | 0 | 0 | 0 | 15 | 0 | 0 | 0 | 0 | 0 |
| EXAMPLE A27 | 30 | 0 | 0 | 0 | 0 | 0 | 0 | 0 | 1 | 0 | 0 | 0 | 0 | 15 | 0 | 0 | 0 | 0 | 0 |
| EXAMPLE A28 | 15 | 0 | 0 | 0 | 0 | 0 | 0 | 0 | 1 | 0 | 0 | 0 | 0 | 0.1 | 0 | 0 | 0 | 0 | 0 |
| EXAMPLE A29 | 15 | 0 | 0 | 0 | 0 | 0 | 0 | 0 | 1 | 0 | 0 | 0 | 0 | 30 | 0 | 0 | 0 | 0 | 0 |
| EXAMPLE A30 | 0 | 15 | 0 | 0 | 0 | 0 | 0 | 0 | 1 | 0 | 0 | 0 | 0 | 15 | 0 | 0 | 0 | 0 | 0 |
| EXAMPLE A31 | 0 | 0 | 15 | 0 | 0 | 0 | 0 | 0 | 1 | 0 | 0 | 0 | 0 | 15 | 0 | 0 | 0 | 0 | 0 |
| EXAMPLE A32 | 15 | 0 | 0 | 0 | 0 | 0 | 0 | 0 | 0 | 0 | 0 | 0 | 1 | 15 | 0 | 0 | 0 | 0 | 0 |
| EXAMPLE A33 | 15 | 0 | 0 | 0 | 0 | 0 | 0 | 0 | 1 | 0 | 0 | 0 | 0 | 15 | 0 | 0 | 0 | 0 | 0 |
| EXAMPLE A34 | 15 | 0 | 0 | 0 | 0 | 0 | 0 | 0 | 1 | 0 | 0 | 0 | 0 | 15 | 0 | 0 | 0 | 0 | 0 |
| EXAMPLE A35 | 13 | 1 | 1 | 0 | 0 | 0 | 0 | 0.2 | 0.8 | 0 | 0 | 0 | 0 | 14 | 1 | 0 | 0 | 0 | 0 |
| COMPARATIVE EXAMPLE A1 | 0 | 0 | 0 | 15 | 1.5 | 0 | 0 | 0 | 0 | 0 | 0 | 0 | 0 | 15 | 0 | 0 | 0 | 0 | 0 |
| COMPARATIVE EXAMPLE A2 | 15 | 0 | 0 | 0 | 0 | 0 | 0 | 0 | 0 | 0 | 0 | 0 | 0 | 15 | 0 | 0 | 0 | 0 | 0 |
| COMPARATIVE EXAMPLE A3 | 15 | 0 | 0 | 0 | 0 | 0 | 0 | 0 | 0 | 0 | 0 | 0 | 0 | 0 | 15 | 0 | 0 | 0 | 0 |

TABLE 4-continued

| | | | | | | | | | | | | | | | | | | | |
|---|---|---|---|---|---|---|---|---|---|---|---|---|---|---|---|---|---|---|---|
| COMPARATIVE EXAMPLE A4 | 15 | 0 | 0 | 0 | 1.5 | 0 | 0 | 0 | 0 | 0 | 0 | 0 | 0 | 0 | 0 | 0 | 0 | 0 | 0 |
| COMPARATIVE EXAMPLE A5 | 15 | 0 | 0 | 0 | 1.5 | 0 | 0 | 0 | 0 | 0 | 0 | 0 | 0 | 0 | 0 | 0 | 0 | 0 | 0 |

| | BLENDING AMOUNT [PARTS BY MASS] | | | | | | | |
|---|---|---|---|---|---|---|---|---|
| | CUMARIN COMPOUND | | OTHER COMPONENTS | | PURIFIED | | | |
| | AY 184 | AY 250 | A1' | B1' | WATER | XA/XD | XB/XD | XA/XB |
| EXAMPLE A21 | 0 | 0 | 0 | 0 | 69.7 | 0.02 | 1.00 | 0.02 |
| EXAMPLE A22 | 0 | 0 | 0 | 0 | 72.5 | 0.50 | 0.33 | 1.50 |
| EXAMPLE A23 | 0 | 0 | 0 | 0 | 70 | 0.67 | 0.33 | 2.00 |
| EXAMPLE A24 | 0 | 0 | 0 | 0 | 69 | 0.00 | 1.00 | 0.00 |
| EXAMPLE A25 | 0 | 0 | 0 | 0 | 69 | 0.00 | 1.00 | 0.00 |
| EXAMPLE A26 | 0 | 0 | 0 | 0 | 83.9 | 10.00 | 150.00 | 0.07 |
| EXAMPLE A27 | 0 | 0 | 0 | 0 | 54 | 0.03 | 0.50 | 0.07 |
| EXAMPLE A28 | 0 | 0 | 0 | 0 | 83.9 | 0.07 | 0.01 | 10.00 |
| EXAMPLE A29 | 0 | 0 | 0 | 0 | 54 | 0.07 | 2.00 | 0.03 |
| EXAMPLE A30 | 0 | 0 | 0 | 0 | 69 | 0.07 | 1.00 | 0.07 |
| EXAMPLE A31 | 0 | 0 | 0 | 0 | 69 | 0.07 | 1.00 | 0.07 |
| EXAMPLE A32 | 0 | 0 | 0 | 0 | 69 | 0.00 | 1.00 | 0.00 |
| EXAMPLE A33 | 3 | 0 | 0 | 0 | 66 | 0.07 | 1.00 | 0.07 |
| EXAMPLE A34 | 0 | 3 | 0 | 0 | 66 | 0.07 | 1.00 | 0.07 |
| EXAMPLE A35 | 0 | 0 | 0 | 0 | 69 | 0.07 | 1.00 | 0.07 |
| COMPARATIVE EXAMPLE A1 | 0 | 0 | 0 | 0 | 68.5 | — | — | 0.10 |
| COMPARATIVE EXAMPLE A2 | 0 | 0 | 0 | 0 | 70 | 0.00 | 1.00 | 0.00 |
| COMPARATIVE EXAMPLE A3 | 0 | 0 | 1.5 | 0 | 68.5 | 0.00 | 1.00 | 0.00 |
| COMPARATIVE EXAMPLE A4 | 0 | 0 | 0 | 15 | 68.5 | 0.10 | 0.00 | — |
| COMPARATIVE EXAMPLE A5 | 0 | 0 | 0 | 0 | 83.5 | 0.10 | 0.00 | — |

2. Evaluation of Stock Solution for Ink-Jet Ink Production 2-1. Change in Particle Diameter After the average particle diameter of the dye immediately after the production and the average particle diameter of the dye which was contained in a predetermined container and was then left for one week in an environment at 60° C. were obtained from the stock solution for ink-jet ink production of each of Examples and Comparative Examples, from the values thus obtained, the rate of change in the average particle diameter of the dye which was left for one week in an environment at 60° C. to the average particle diameter of the dye immediately after the production was obtained, and evaluation was performed in accordance with the following criteria. In addition, in Examples A1 to A35 and Comparative Examples A2 to A5, the dye was used as a dye, the average particle diameter of which was to be measured, and in Comparative Example A1, C.I. Disperse Yellow 54 was used as a dye, the average particle diameter of which was to be measured. In addition, for the measurement of the average particle diameter, a Microtrac UPA (manufactured by Nikkiso Co., Ltd.) was used. It can be said that as the rate of change in the average particle diameter is increased, the storage stability is degraded.

A: Rate of change in average particle diameter of less than 5%.

B: Rate of change in average particle diameter of 5% to less than 10%.

C: Rate of change in average particle diameter of 10% to less than 15%.

D: Rate of change in average particle diameter of 15% to less than 20%.

E: Rate of change in average particle diameter of 20% or more.

2-2. Generation of Foreign Materials

The stock solution for ink-jet ink production of each of Examples and Comparative Examples in an amount of 10 mL was received in a predetermined glass bottle so that a gas-liquid interface existed and was then left for five days in an environment at 60° C. Subsequently, after the stock solution for ink-jet ink production was filtrated by a metal mesh filter having an opening diameter of 10 μm, the number of solid materials remaining on the metal mesh filer per square millimeter was counted, and evaluation was performed in accordance with the following criteria. It can be said that as the amount of foreign materials thus generated is increased, the storage stability is degraded.

A: The number of solid materials per square millimeter is less than 5.

B: The number of solid materials per square millimeter is 5 to less than 10.

C: The number of solid materials per square millimeter is 10 to less than 30.

D: The number of solid materials per square millimeter is 30 to less than 50.

E: The number of solid materials per square millimeter is 50 or more.

Those results are collectively shown in Tables 5 and 6.

TABLE 5

| | CHANGE IN PARTICLE DIAMETER | GENERATION OF FOREIGN MATERIALS |
|---|---|---|
| EXAMPLE A1 | A | A |
| EXAMPLE A2 | A | A |
| EXAMPLE A3 | A | A |
| EXAMPLE A4 | A | A |
| EXAMPLE A5 | A | A |
| EXAMPLE A6 | A | A |
| EXAMPLE A7 | A | A |
| EXAMPLE A8 | A | A |
| EXAMPLE A9 | A | A |
| EXAMPLE A10 | A | A |
| EXAMPLE A11 | B | B |
| EXAMPLE A12 | C | C |
| EXAMPLE A13 | B | B |
| EXAMPLE A14 | C | C |
| EXAMPLE A15 | C | D |
| EXAMPLE A16 | D | A |
| EXAMPLE A17 | C | A |
| EXAMPLE A18 | C | C |
| EXAMPLE A19 | D | D |
| EXAMPLE A20 | D | A |

TABLE 6

| | CHANGE IN PARTICLE DIAMETER | GENERATION OF FOREIGN MATERIALS |
|---|---|---|
| EXAMPLE A21 | C | A |
| EXAMPLE A22 | D | C |
| EXAMPLE A23 | D | D |
| EXAMPLE A24 | D | D |
| EXAMPLE A25 | D | D |
| EXAMPLE A26 | A | A |
| EXAMPLE A27 | B | A |
| EXAMPLE A28 | D | A |
| EXAMPLE A29 | D | B |
| EXAMPLE A30 | A | A |
| EXAMPLE A31 | A | A |
| EXAMPLE A32 | A | A |
| EXAMPLE A33 | A | A |
| EXAMPLE A34 | A | A |
| EXAMPLE A35 | A | A |
| COMPARATIVE EXAMPLE A1 | E | D |
| COMPARATIVE EXAMPLE A2 | E | E |
| COMPARATIVE EXAMPLE A3 | E | E |
| COMPARATIVE EXAMPLE A4 | E | E |
| COMPARATIVE EXAMPLE A5 | E | E |

As apparent from Tables 5 and 6, according to the present disclosure, excellent results are obtained. On the other hand, in Comparative Examples, satisfactory results cannot be obtained.

Example B1

3. Preparation of Ink-Jet Ink as Aqueous Ink Jet Composition

The stock solution for ink-jet ink production prepared in Example A1 described above, glycerin, 2-pyrrolidone, propylene glycol, BYK348 (manufactured by BYK Japan KK) as a silicone-based surfactant, and purified water were mixed together at a ratio shown in Table 7, followed by stirring at 3,000 rpm by a high shear mixer (manufactured by Silverson), so that an ink-jet ink as the aqueous ink jet composition was formed.

The average particle diameter of the dye in the ink-jet ink was 150 nm.

Example B2 to B38

Except for that the type of stock solution for ink jet-ink production showed in each of Tables 7 and 8 was used, and the blending ratio between the components was set as shown in each of Tables 7 and 8, an ink-jet ink as the aqueous ink jet composition was formed in a manner similar to that of Example B1.

Comparative Examples B1 to B5

Except for that the type of stock solution for ink-jet ink production shown in Table 8 was used, and the blending ratio between the components was set as shown in Table 8, an ink-jet ink as the aqueous ink jet composition was formed in a manner similar to that of Example B1.

The condition of the ink-jet ink of each of Examples and Comparative Examples are collectively shown in Tables 7 and 8. In addition, in the tables, glycerin is represented by "Gly", 2-pyrrolidoen is represented by "2-Py", propylene glycol is represented by "PG", BYK348 (manufactured by BYK Japan KK) as a silicone-based surfactant is represented by "BYK348", and Olefin EXP4300 (manufactured by Nisshin Chemical Industry Co., Ltd.) as an acetylene-based surfactant is represented by "EXP4300". In addition, the ink-jet ink of each of Examples B1 to B38 had a viscosity in a range of 2.0 to 10 mPa·s, and the surface tension thereof was in a range of 25 to 35 mN/m. In addition, the viscosity was measured at 25° C. using a viscoelastic tester MCR-300 (manufactured by Pysica) such that the shear rate was increased from 10 [s$^{-1}$] to 1,000 [s$^{-1}$], and a viscosity at a shear rate of 200 was read. In addition, the surface tension was measured at 25° C. by Wilhelmy method using a surface tension meter (CBVP-7, manufactured by Kyowa Interface Science Co., Ltd.).

TABLE 7

| | | BLENDING AMOUNT [PARTS BY MASS] | | | | | | | | |
|---|---|---|---|---|---|---|---|---|---|---|
| | STOCK SOLUTION | | SOLVENTS OTHER THAN WATER | | | SURFACTANT | | PURIFIED | | | |
| | TYPE | | Gly | 2-Py | PG | BYK348 | EXP4300 | WATER | XA/XD | XB/XD | XA/XB |
| EXAMPLE B1 | EXAMPLE A1 | 40 | 10 | 5 | 5 | 1 | 0 | 39 | 0.07 | 1.00 | 0.07 |
| EXAMPLE B2 | EXAMPLE A2 | 40 | 10 | 5 | 5 | 1 | 0 | 39 | 0.07 | 1.00 | 0.07 |
| EXAMPLE B3 | EXAMPLE A3 | 40 | 10 | 5 | 5 | 1 | 0 | 39 | 0.07 | 1.00 | 0.07 |
| EXAMPLE B4 | EXAMPLE A4 | 40 | 10 | 5 | 5 | 1 | 0 | 39 | 0.07 | 1.00 | 0.07 |
| EXAMPLE B5 | EXAMPLE A5 | 40 | 10 | 5 | 5 | 1 | 0 | 39 | 0.07 | 1.00 | 0.07 |

TABLE 7-continued

| | STOCK SOLUTION | | SOLVENTS OTHER THAN WATER | | | SURFACTANT | | PURIFIED | | | |
|---|---|---|---|---|---|---|---|---|---|---|---|
| | TYPE | | Gly | 2-Py | PG | BYK348 | EXP4300 | WATER | XA/XD | XB/XD | XA/XB |
| EXAMPLE B6 | EXAMPLE A6 | 40 | 10 | 5 | 5 | 1 | 0 | 39 | 0.07 | 1.00 | 0.07 |
| EXAMPLE B7 | EXAMPLE A7 | 40 | 10 | 5 | 5 | 1 | 0 | 39 | 0.07 | 1.00 | 0.07 |
| EXAMPLE B8 | EXAMPLE A8 | 40 | 10 | 5 | 5 | 1 | 0 | 39 | 0.07 | 1.00 | 0.07 |
| EXAMPLE B9 | EXAMPLE A9 | 40 | 10 | 5 | 5 | 1 | 0 | 39 | 0.07 | 1.00 | 0.07 |
| EXAMPLE B10 | EXAMPLE A10 | 40 | 10 | 5 | 5 | 1 | 0 | 39 | 0.07 | 1.00 | 0.07 |
| EXAMPLE B11 | EXAMPLE A11 | 40 | 10 | 5 | 5 | 1 | 0 | 39 | 0.07 | 1.00 | 0.07 |
| EXAMPLE B12 | EXAMPLE A12 | 40 | 10 | 5 | 5 | 1 | 0 | 39 | 0.003 | 1.00 | 0.003 |
| EXAMPLE B13 | EXAMPLE A13 | 40 | 10 | 5 | 5 | 1 | 0 | 39 | 0.05 | 1.00 | 0.05 |
| EXAMPLE B14 | EXAMPLE A14 | 40 | 10 | 5 | 5 | 1 | 0 | 39 | 1.00 | 1.00 | 1.00 |
| EXAMPLE B15 | EXAMPLE A15 | 40 | 10 | 5 | 5 | 1 | 0 | 39 | 1.33 | 1.00 | 1.33 |
| EXAMPLE B16 | EXAMPLE A16 | 40 | 10 | 5 | 5 | 1 | 0 | 39 | 0.07 | 0.33 | 0.20 |
| EXAMPLE B17 | EXAMPLE A17 | 40 | 10 | 5 | 5 | 1 | 0 | 39 | 0.07 | 0.40 | 0.17 |
| EXAMPLE B18 | EXAMPLE A18 | 40 | 10 | 5 | 5 | 1 | 0 | 39 | 0.13 | 2.00 | 0.07 |
| EXAMPLE B19 | EXAMPLE A19 | 40 | 10 | 5 | 5 | 1 | 0 | 39 | 0.13 | 2.67 | 0.05 |
| EXAMPLE B20 | EXAMPLE A20 | 40 | 10 | 5 | 5 | 1 | 0 | 39 | 0.003 | 1.00 | 0.003 |
| EXAMPLE B21 | EXAMPLE A21 | 40 | 10 | 5 | 5 | 1 | 0 | 39 | 0.02 | 1.00 | 0.02 |
| EXAMPLE B22 | EXAMPLE A22 | 40 | 10 | 5 | 5 | 1 | 0 | 39 | 0.50 | 0.33 | 1.50 |

TABLE 8

| | STOCK SOLUTION | | SOLVENTS OTHER THAN WATER | | | SURFACTANT | | PURIFIED | | | |
|---|---|---|---|---|---|---|---|---|---|---|---|
| | TYPE | | Gly | 2-Py | PG | BYK348 | EXP4300 | WATER | XA/XD | XB/XD | XA/XB |
| EXAMPLE B23 | EXAMPLE A23 | 40 | 10 | 5 | 5 | 1 | 0 | 39 | 0.67 | 0.33 | 2.00 |
| EXAMPLE B24 | EXAMPLE A24 | 40 | 10 | 5 | 5 | 1 | 0 | 39 | 0.00 | 1.00 | 0.00 |
| EXAMPLE B25 | EXAMPLE A25 | 40 | 10 | 5 | 5 | 1 | 0 | 39 | 0.00 | 1.00 | 0.00 |
| EXAMPLE B26 | EXAMPLE A26 | 40 | 10 | 5 | 5 | 1 | 0 | 39 | 10.00 | 150.00 | 0.07 |
| EXAMPLE B27 | EXAMPLE A27 | 40 | 10 | 5 | 5 | 1 | 0 | 39 | 0.03 | 0.50 | 0.07 |
| EXAMPLE B28 | EXAMPLE A28 | 40 | 10 | 5 | 5 | 1 | 0 | 39 | 0.07 | 0.01 | 10.00 |
| EXAMPLE B29 | EXAMPLE A29 | 40 | 10 | 5 | 5 | 1 | 0 | 39 | 0.07 | 2.00 | 0.03 |
| EXAMPLE B30 | EXAMPLE A5 | 40 | 10 | 5 | 5 | 0 | 1 | 39 | 0.07 | 1.00 | 0.07 |
| EXAMPLE B31 | EXAMPLE A5 | 10 | 20 | 5 | 5 | 1 | 0 | 59 | 0.07 | 1.00 | 0.07 |
| EXAMPLE B32 | EXAMPLE A5 | 80 | 5 | 5 | 5 | 1 | 0 | 4 | 0.07 | 1.00 | 0.07 |
| EXAMPLE B33 | EXAMPLE A30 | 40 | 10 | 5 | 5 | 1 | 0 | 39 | 0.07 | 1.00 | 0.07 |
| EXAMPLE B34 | EXAMPLE A31 | 40 | 10 | 5 | 5 | 1 | 0 | 39 | 0.07 | 1.00 | 0.07 |
| EXAMPLE B35 | EXAMPLE A32 | 40 | 10 | 5 | 5 | 1 | 0 | 39 | 0.07 | 1.00 | 0.00 |
| EXAMPLE B36 | EXAMPLE A33 | 40 | 10 | 5 | 5 | 1 | 0 | 39 | 0.07 | 1.00 | 0.07 |
| EXAMPLE B37 | EXAMPLE A34 | 40 | 10 | 5 | 5 | 1 | 0 | 39 | 0.07 | 1.00 | 0.07 |
| EXAMPLE B38 | EXAMPLE A35 | 40 | 10 | 5 | 5 | 1 | 0 | 39 | 0.07 | 1.00 | 0.07 |
| COMPARATIVE EXAMPLE B1 | COMPARATIVE EXAMPLE A1 | 50 | 10 | 5 | 5 | 1 | 0 | 29 | — | — | 0.10 |
| COMPARATIVE EXAMPLE B2 | COMPARATIVE EXAMPLE A3 | 50 | 10 | 5 | 5 | 1 | 0 | 29 | 0.00 | 1.00 | 0.00 |
| COMPARATIVE EXAMPLE B3 | COMPARATIVE EXAMPLE A4 | 5 | 10 | 5 | 5 | 1 | 0 | 74 | 0.00 | 1.00 | 0.00 |
| COMPARATIVE EXAMPLE B4 | COMPARATIVE EXAMPLE A5 | 50 | 10 | 5 | 5 | 1 | 0 | 29 | 0.10 | 0.00 | — |
| COMPARATIVE EXAMPLE B5 | COMPARATIVE EXAMPLE A6 | 50 | 10 | 5 | 5 | 1 | 0 | 29 | 0.10 | 0.00 | — |

4. Evaluation of Ink-Jet Ink
4-1. Change in Particle Diameter

After the average particle diameter of the dye immediately after the production and the average particle diameter of the dye which was contained in a predetermined ink container and was then left for one week in an environment at 60° C. were obtained from the ink-jet ink of each of Examples and Comparative Examples, from the values thus obtained, the rate of change in the average particle diameter of the dye which was left for one week in an environment at 60° C. to the average particle diameter of the dye immediately after the production was obtained, and evaluation was performed in accordance with the following criteria. In Examples B1 to B38 and Comparative Examples B2 to B5, the dye was used as a dye, the average particle diameter of which was to be measured, and in Comparative Example B1, C.I. Disperse Yellow 54 was used as a dye, the average particle diameter of which was to be measured. In addition, for the measurement of the average particle diameter, a Microtrac UPA (manufactured by Nikkiso Co., Ltd.) was used. It can be said that as the rate of change in the average particle diameter is increased, the storage stability is degraded.

A: Rate of change in average particle diameter of less than 5%.

B: Rate of change in average particle diameter of 5% to less than 10%.
C: Rate of change in average particle diameter of 10% to less than 15%.
D: Rate of change in average particle diameter of 15% to less than 20%.
E: Rate of change in average particle diameter of 20% or more.

4-2. Generation of Foreign Materials

The ink-jet ink of each of Examples and Comparative Examples in an amount of 10 mL was received in a predetermined glass bottle so that a gas-liquid interface existed and was then left for five days in an environment at 60° C. Subsequently, after the ink-jet ink was filtrated by a metal mesh filter having an opening diameter of 10 µm, the number of solid materials remaining on the metal mesh filer per square millimeter was counted, and evaluation was performed in accordance with the following criteria. It can be said that as the amount of foreign materials thus generated is increased, the storage stability is degraded.

A: The number of solid materials per square millimeter is less than 5.
B: The number of solid materials per square millimeter is 5 to less than 10.
C: The number of solid materials per square millimeter is 10 to less than 30.
D: The number of solid materials per square millimeter is 30 to less than 50.
E: The number of solid materials per square millimeter is 50 or more.

4-3. Ejection Stability by Ink Jet Method

The ink-jet ink of each of Examples and Comparative Examples was filled in a predetermined ink container and was then left for five days in an environment at 60° C.

Subsequently, after the container described above was fitted to a recording apparatus PX-H6000 (manufactured by Seiko Epson Corporation), the ink-jet ink was ejected, so that a solid pattern was adhered to TRANSJET Classic (manufactured by Cham Paper) functioning as an intermediate transfer medium at a recording resolution of 1,440×720 dpi. In addition, the operation environment of the recording apparatus was set to a temperature of 40° C. and a relative humidity of 20%.

The number of missing nozzles was investigated when the solid pattern was formed on 30 intermediate transfer media, and evaluation was performed in accordance with the following criteria. It can be said that as the number of missing nozzles is increased, the ejection stability is degraded.

A: The number of missing nozzles is zero.
B: The number of missing nozzles is 1 to 9.
C: The number of missing nozzles is 10 to 19.
D: The number of missing nozzles is 20 to 29.
E: The number of missing nozzles is 30 or more.

In addition, the ink container of PX-H6000 manufactured by Seiko Epson Corporation has an ink charge port through which the aqueous ink jet composition can be replenished and is opened to the air when the ink container is fitted to the recording apparatus in a ready to use state.

4-4. Clogging Recovery Property

After the ink-jet ink of each of Examples and Comparative Examples was filled in a predetermined container, this container was fitted to PX-H6000 manufactured by Seiko Epson Corporation.

After normal ejection from all nozzles was confirmed, the recording apparatus under the normal condition was placed in an Off state and was then left for one month in an environment at 40° C.

Subsequently, the number of recovery operations performed by suction until the normal ejection was recovered was obtained, and evaluation was performed in accordance with the following criteria.

A: Normal ejection is performed by one to three recovery operations.
B: Normal ejection is performed by four to six recovery operations.
C: Normal ejection is performed by seven to nine recovery operations.
D: After nine recovery operations are performed, the apparatus is left at room temperature for 12 hours, and normal ejection is then performed by additional one to three recovery operations.
E: After nine recovery operations are performed, the apparatus is left at room temperature for 12 hours, and normal ejection is still not performed by additional three recovery operations.

4-5. Coloring Property

After one side of the $30^{th}$ intermediate transfer medium to which the ink-jet ink was adhered in the above 4-3 on which the aqueous ink jet composition was adhered was closely brought into contact with a cloth (100% of a polyester, Amina, manufactured by Toray Industries, Inc.) which was a white recording medium, and in the state described above, by using a heat press machine (TP-608M, manufactured by Taiyo Seiki Co., Ltd.), sublimation transfer was performed by heating at 180° C. for 60 seconds, so that a recorded matter was obtained.

Evaluation of the coloring property of the recorded matter thus obtained was performed. In particular, after the optical density (OD) value of the recorded matter thus obtained was measured using a colorimeter (Gretag Macbeth Spectrolino, manufactured by X-Rite), evaluation was performed in accordance with the following criteria. It can be said that as the OD value is decreased, the coloring property is degraded.

A: OD value of 1.50 or more.
B: OD value of 1.45 to less than 1.50.
C: OD value of 1.40 to less than 1.45.
D: OD value of 1.35 to less than 1.40.
E: OD value of less than 1.35.

Those results are collectively shown in Tables 9 and 10.

TABLE 9

|  | CHANGE IN PARTICLE DIAMETER | GENERATION OF FOREIGN MATERIALS | EJECTION STABILITY | CLOGGING RECOVERY PROPERTY | COLORING PROPERTY |
|---|---|---|---|---|---|
| EXAMPLE B1 | A | A | A | A | A |
| EXAMPLE B2 | A | A | A | A | A |
| EXAMPLE B3 | A | A | A | A | A |
| EXAMPLE B4 | A | A | A | A | A |
| EXAMPLE B5 | A | A | A | A | A |
| EXAMPLE B6 | A | A | A | A | A |

TABLE 9-continued

| | CHANGE IN PARTICLE DIAMETER | GENERATION OF FOREIGN MATERIALS | EJECTION STABILITY | CLOGGING RECOVERY PROPERTY | COLORING PROPERTY |
|---|---|---|---|---|---|
| EXAMPLE B7 | A | A | A | A | A |
| EXAMPLE B8 | A | A | A | A | A |
| EXAMPLE B9 | A | A | A | A | A |
| EXAMPLE B10 | A | A | A | A | A |
| EXAMPLE B11 | B | B | A | A | A |
| EXAMPLE B12 | C | C | A | A | A |
| EXAMPLE B13 | B | B | A | A | A |
| EXAMPLE B14 | C | C | B | B | C |
| EXAMPLE B15 | C | D | B | B | C |
| EXAMPLE B16 | D | A | B | C | A |
| EXAMPLE B17 | C | A | B | C | A |
| EXAMPLE B18 | C | A | B | B | C |
| EXAMPLE B19 | D | A | B | B | C |
| EXAMPLE B20 | D | A | A | A | A |
| EXAMPLE B21 | C | A | A | A | A |
| EXAMPLE B22 | D | C | B | A | A |

TABLE 10

| | CHANGE IN PARTICLE DIAMETER | GENERATION OF FOREIGN MATERIALS | EJECTION STABILITY | CLOGGING RECOVERY PROPERTY | COLORING PROPERTY |
|---|---|---|---|---|---|
| EXAMPLE B23 | D | D | A | A | A |
| EXAMPLE B24 | D | D | A | A | A |
| EXAMPLE B25 | D | D | A | A | A |
| EXAMPLE B26 | A | A | C | B | D |
| EXAMPLE B27 | B | A | D | C | A |
| EXAMPLE B28 | D | A | C | D | A |
| EXAMPLE B29 | D | B | D | B | A |
| EXAMPLE B30 | B | B | B | B | A |
| EXAMPLE B31 | A | A | A | A | B |
| EXAMPLE B32 | D | D | C | C | A |
| EXAMPLE B33 | A | A | A | B | B |
| EXAMPLE B34 | A | A | A | B | B |
| EXAMPLE B35 | B | A | B | A | A |
| EXAMPLE B36 | A | A | A | A | A |
| EXAMPLE B37 | A | A | A | A | A |
| EXAMPLE B38 | A | A | A | A | A |
| COMPARATIVE EXAMPLE B1 | E | D | A | B | E |
| COMPARATIVE EXAMPLE B2 | E | E | A | B | A |
| COMPARATIVE EXAMPLE B3 | E | E | C | E | A |
| COMPARATIVE EXAMPLE B4 | E | E | A | E | A |
| COMPARATIVE EXAMPLE B5 | E | E | E | E | A |

As apparent from Tables 9 and 10, according to the present disclosure, excellent results can be obtained. On the other hand, in Comparative Examples, satisfactory results cannot be obtained.

What is claimed is:

1. An aqueous ink jet composition comprising:
   at least one dye selected from the group consisting of C.I. Solvent Yellow 160:1, C.I. Disperse Yellow 82, and C.I. Disperse Yellow 184;
   a material A which is at least one compound selected from the group consisting of a compound represented by the following formula (1) and a compound represented by the following formula (2);
   an anionic dispersant; and
   C.I. Acid Yellow 250,

[Chem. 1]

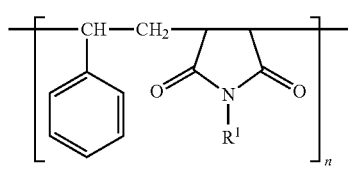

(1)

wherein in the formula (1), $R^1$ represents a hydrocarbon group having six carbon atoms or less or —$(CH_2)_m$—$NR^8R^9$ in which m represents an integer of six or less, and $R^8$ and $R^9$ each independently represent a hydrogen atom or a hydrocarbon group having six carbon atoms or less, and n represents an integer of one or more, and

[Chem. 2]

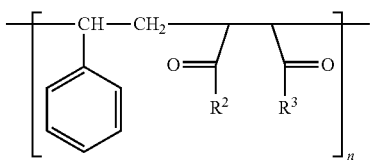
(2)

in the formula (2), one of $R^2$ and $R^3$ represents —OH, the other represents —$NR^4R^5$ in which $R^4$ and $R^5$ each independently represent a hydrogen atom or a hydrocarbon group having six carbon atoms or less, and n represents an integer of one or more.

2. The aqueous ink jet composition according to claim 1, wherein the anionic dispersant is at least one of a compound represented by the following formula (3), a sodium salt of a naphthalenesulfonic acid formalin condensate, and a ligninsulfonic acid,

[Chem. 3]

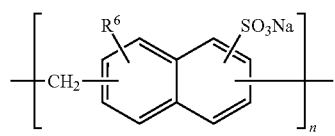
(3)

wherein in the formula (3), $R^6$ represents a hydrocarbon group having four carbon atoms or less, and n represents an integer of one or more.

3. The aqueous ink jet composition according to claim 1, wherein the dye contains at least C.I. Solvent Yellow 160:1, and 0.05≤XA/XD≤1.0, the content of C.I. Solvent Yellow 160:1 and the content of the material A in the aqueous ink jet composition being represented by XD and XA, respectively, in percent by mass.

4. The aqueous ink jet composition according to claim 1, wherein the dye contains at least C.I. Solvent Yellow 160:1, and 0.4≤XB/XD≤2.0, the content of C.I. Solvent Yellow 160:1 and the content of the anionic dispersant in the aqueous ink jet composition being represented by XD and XB, respectively, in percent by mass.

5. The aqueous ink jet composition according to claim 1, wherein 0.02≤XA/XB≤1.5, the content of the material A and the content of the anionic dispersant in the aqueous ink jet composition being represented by XA and XB, respectively, in percent by mass.

6. The aqueous ink jet composition according to claim 1, wherein the anionic dispersant has a weight average molecular weight of 1,000 to 20,000.

7. The aqueous ink jet composition according to claim 1, wherein the aqueous ink jet composition is used in an air open-type recording apparatus.

8. An aqueous ink jet composition comprising:
at least one dye selected from the group consisting of C.I. Solvent Yellow 160:1, C.I. Disperse Yellow 82, and C.I. Disperse Yellow 184;
a material A which is at least one compound selected from the group consisting of a compound represented by the following formula (1), a compound represented by the following formula (2), an ethylene oxide adduct of tristyrylphenol, and a derivative of an ethylene oxide adduct of tristyrylphenol;
an anionic dispersant; and
C.I. Acid Yellow 250,

[Chem. 1]

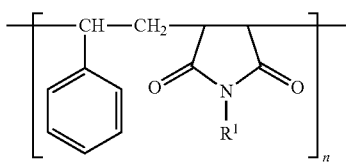
(1)

wherein in the formula (1), $R^1$ represents a hydrocarbon group having six carbon atoms or less or —$(CH_2)_m$—$NR^8R^9$ in which m represents an integer of six or less, and $R^8$ and $R^9$ each independently represent a hydrogen atom or a hydrocarbon group having six carbon atoms or less, and n represents an integer of one or more,

[Chem. 2]

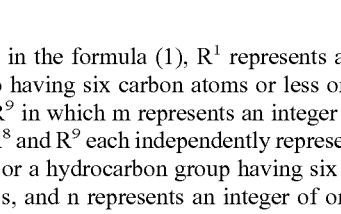
(2)

in the formula (2), one of $R^2$ and $R^3$ represents —OH, the other represents —$NR^4R^5$ in which $R^4$ and $R^5$ each independently represent a hydrogen atom or a hydrocarbon group having six carbon atoms or less, and n represents an integer of one or more, and
wherein the anionic dispersant includes a compound represented by the following formula (3),

[Chem. 3]

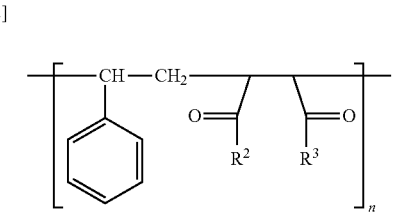
(3)

wherein in the formula (3), $R^6$ represents a hydrocarbon group having four carbon atoms or less, and n represents an integer of one or more.

9. An aqueous ink jet composition comprising:
at least one dye selected from the group consisting of C.I. Solvent Yellow 160:1, C.I. Disperse Yellow 82, and C.I. Disperse Yellow 184;
a material A which is at least one compound selected from the group consisting of a compound represented by the following formula (1) and a compound represented by the following formula (2); and an anionic dispersant having a weight average molecular weight of 2000 to 20000,

[Chem. 1]

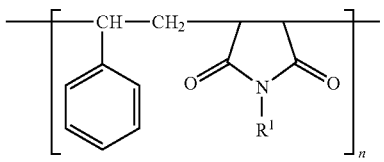

(1)

wherein in the formula (1), $R^1$ represents a hydrocarbon group having six carbon atoms or less or —$(CH_2)_m$—$NR^8R^9$ in which m represents an integer of six or less, and $R^8$ and $R^9$ each independently represent a hydrogen atom or a hydrocarbon group having six carbon atoms or less, and n represents an integer of one or more, and

[Chem. 2]

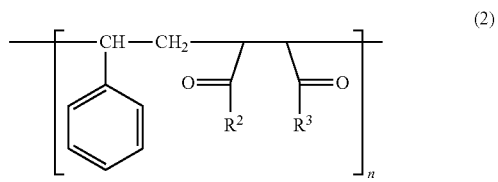

(2)

in the formula (2), one of $R^2$ and $R^3$ represents —OH, the other represents —$NR^4R^5$ in which $R^4$ and $R^5$ each independently represent a hydrogen atom or a hydrocarbon group having six carbon atoms or less, and n represents an integer of one or more.

* * * * *